United States Patent [19]
Rausch et al.

[11] Patent Number: 5,396,920
[45] Date of Patent: Mar. 14, 1995

[54] WATER-COOLED HOUSING FOR A HOT-BLAST SLIDE VALVE

[75] Inventors: Jos. Rausch, Metert; Marcel Wener, Grevenmacher, both of Luxembourg

[73] Assignee: Nouvelle Usine de Wecker S.A., Wecker, Luxembourg

[21] Appl. No.: 107,652

[22] PCT Filed: Dec. 3, 1992

[86] PCT No.: PCT/EP92/02794
§ 371 Date: Aug. 17, 1993
§ 102(e) Date: Aug. 17, 1993

[87] PCT Pub. No.: WO93/12365
PCT Pub. Date: Jun. 24, 1993

[30] Foreign Application Priority Data
Dec. 18, 1991 [DE] Germany .................... 41 41 801.8

[51] Int. Cl.$^6$ .................................................. F16K 49/00
[52] U.S. Cl. ..................................... 137/340; 251/367
[58] Field of Search ........................... 137/340; 251/367

[56] References Cited
FOREIGN PATENT DOCUMENTS

| 2328085 | 7/1974 | Germany . |
| 2364915 | 7/1975 | Germany . |
| 2518074 | 11/1976 | Germany . |
| 2538357 | 3/1977 | Germany . |
| 2850640 | 6/1980 | Germany . |
| 2909467 | 9/1980 | Germany . |
| 974250 | 11/1964 | United Kingdom . |

*Primary Examiner*—A. Michael Chambers
*Attorney, Agent, or Firm*—Hill, Steadman & Simpson

[57] ABSTRACT

The invention concerns a water-cooled casing for a hot-blast slide valve, in particular a slide valve in a pipe lined with refractory material. The casing has annular cooling-water ducts disposed concentrically with respect to each other in pairs, one downstream of the other with respect to the hot-air blast and on both sides of the space through which the sliding plate of the valve passes. The annular ducts are formed by two monobloc-construction casing components, each of which has two substantially annular hollows, the hollows being closed over by first and second annular components to form the ducts.

16 Claims, 2 Drawing Sheets

WATER-COOLED HOUSING FOR A HOT-BLAST SLIDE VALVE

BACKGROUND OF THE INVENTION

The invention is directed to a water-cooled housing for a hot-blast slide valve particularly in conduits lined with refractory material, comprising annular coolant channels that are arranged at both sides of a guide space for a valve plate lying following one another in a flow direction of the hot-blast and that are seated concentrically inside one another in pairs as employed, for example, in blast heating systems, blast furnaces or high-temperature testing stands in testing institutes as well.

Such housings are known. Thus, DE-AS 23 64 915 discloses a water-cooled housing for hot-blast slide valves, whereby an annular coolant channel placed preceding the guide space in flow-through direction of the hot blast and an annular coolant channel placed following the guide space in flow-through direction of the hot blast are respectively connected immediately following one another in the same coolant circulation. Such a housing has definitely proven itself in practical operation; it is considered a disadvantage, however, that the manufacture of the housing which is usually executed as a welded structure is relatively complicated since a relatively great number of component parts must be manufactured for forming the annular coolant channels and these must then be joined to one another with a corresponding plurality of welds.

A water-cooled housing for hot-blast slide valves is also disclosed by DE-AS 23 28 085. This Reference discloses a water-cooled high-temperature slide valve, particularly a hot-blast slide weld, whereby annular channels for the coolant (water) are provided in the housing which proceed from the upper part of the slide valve along the sealing ledges at both circumferential sides down to the lower region of the housing and discharge into at least one cooling channel via overflow openings provided at this location, this cooling channel returning around the region of the housing arranged around the valve plate to the upper part of the housing in which the coolant discharge is located, whereby the flow cross-section of the cooling channel wherein the coolant is returned is smaller—at least in its lower region covering 180°—but at most of the same size as the overall flow cross-section of the annular channels. The object of the inventor in that patent was to enhance the reliability and the efficiency of the cooling in high-temperature slide valves, particularly hot-blast slide valves, namely while making the housing design simpler and less expensive as well as reducing the space requirements of the housing design insofar as possible at the same time. This housing is also fabricated as a weldment and has a rather complicated structure since special baffles are provided in the coolant space in order to maintain a coolant speed that is adequate for entraining solids situated in the coolant, this increasing the outlay of the manufacture and being viewed as a disadvantage.

EP 0 171 754 A1 also discloses a hot-blast slide valve. This reference discloses of a hot-blast slide valve, particularly for hot-blast systems of blast furnaces, that is composed of a valve housing formed of sheet metal plates, of a valve plate, or a valve hood secured on the valve housing that serves the purpose of accepting the valve plate in the opened condition of the valve, of seats between which the slide plate is situated in the closed condition, of cooling channels and of refractory protective linings toward the hot-blast side, whereby the seat against which the valve plate is supported in the closed condition is composed of metal which is in thermal contact with a coolant, and whereby the side opposite the said seat is only composed of refractory material.

The hot-blast slide valve disclosed, consequently, comprises cooling channels only toward the hot-blast side, this being considered disadvantageous with respect to the cooling effect under high load. The structure at the hot-blast entry side is as complicated and involved to manufacture as the housings set forth above.

Finally, German Published Application 25 38 357 discloses a high-temperature slide valve, particularly a hot-blast slide valve, comprising a water-cooled valve housing that is provided with two end flanges, this valve housing comprising coolant channels and, in particular, water-cooled sealing ledges as well as a chamber arranged transversely relative to the longitudinal axis of the flow-through cross-section of the gas passage, a valve plate for closing and opening this flow cross-section being guided in said chamber, whereby an actuation means is detachably secured to the housing at one end of this chamber, whereby the entire middle part of the valve housing that surrounds the chamber for the valve plate is rectangularly fashioned on all sides and has the end face lying opposite the mounting side for the actuation means provided with a terminating wall.

It is provided in one development that coolant channels which attach outside of the middle part and circulating around the tubular projections of the valve housing are provided in addition to coolant channels within the sealing ledges, whereby the coolant that initially flows through the sealing ledges is connected to the coolant discharge.

Even though it is considered an advantage that the valve housing can be implemented as a simple weldment, it nonetheless remains as a disadvantage that the component parts employed for that purpose (for example, the coolant channels) must, at least partly, be specifically manufactured for this purpose with considerable outlay.

SUMMARY OF THE INVENTION

The object of the present invention is to further improve a housing of the species for hot-blast slide valves upon retention of the stability and cooling effect such that the manufacture becomes simpler and the welding jobs to be thereby performed are reduced.

In a housing of the species, this object is achieved in that the annular channels are formed by two one-piece housing parts each of which respectively comprises two essentially annular depressions, said depressions being connectable by first and second annular parts for the formation of the annular channels.

The manufacture is greatly simplified by employing a respective housing part comprising annular depressions, being employed at every outside directed toward the conduits. The annular channels are partly integrated into these parts and are otherwise formed of annular components parts that close the depressions. Only three component parts are thereby required at each of the two outsides in order to respectively form two annular channels concentrically seated inside one another.

It is thereby advantageously provided that the depressions for the outer annular channels of the annular channels seated concentrically inside one another in pairs are open in the direction toward the flanges. It is also advantageously provided that the depressions for the inner annular channels of the annular channels seated inside one another in pairs are open in the direction toward the valve plate. In this manner, each of the one-piece housing parts, each of which respectively comprises two annular depressions, is essentially rotationally symmetrical relative to a center axis that proceeds parallel to the flow direction. Each one-piece housing part has a cross-section that comprises a first, radially proceeding region in the region of its greatest diameter that forms the flange for connection to the conduit, and a second, axial region in the region of the inside diameter of the flange that forms a first part of the wall of the outer annular channel. Following thereupon the cross section further comprises a second region that extends radially relative to the center axis that forms a second part of the wall of the outer annular channel. Following thereupon, the cross section merges approximately rectangularly toward both sides into the one leg of an approximately U-shaped region that is arranged approximately horizontally that is open toward the valve plate and forms a part of the wall of the inner annular channel, whereby the one leg section proceeding toward the apex of the U-shaped region forms a third part of the wall of the outer annular channel.

As a result thereof, the housing parts can be simply and economically manufactured by lathing.

It is also advantageously provided that the legs of the U-shaped region lying toward the axis are shorter than the respective legs lying opposite, whereby the second annular part expediently comprises a U-shaped cross-section having legs of different lengths that supplements the U-shaped region of the housing part for forming the inner annular channel.

The infeed required for shaping the U-shaped region of the housing part is thereby simplified.

Expediently, the first annular part for forming the outer annular channel has the shape of an essentially flat, annular steel plate. As a result thereof, this part can be manufactured in an especially simple way, for example with a cutting stroke or torch process from a plate.

It is advantageously provided that the first annular component parts can be connected to the housing parts with a respective weld proceeding at their inner and at their outer diameter. As a result thereof, the welding can be unproblematically implemented with two round seams at easily accessible locations.

Finally, it is advantageously provided that the second annular parts can each be connected to the housing parts with a respective weld proceeding at the free ends of the legs. As a result thereof, this welding process can also be economically implemented without difficulty.

The noses of the invention that lie against the valve can be advantageously replaced in an especially cost-beneficial way. Further, the symmetry guarantees that no over-dimensioned braces or the like are required, as is the case given an asymmetrical embodiment that necessarily exhibits unequal distributions of forces. Construction is thus advantageously more cost-beneficial and the design is lighter and simpler.

The connection of the coolant admission and discharge corresponds to the prior art, for example in conformity with AS 23 64 915 and is not set forth in greater detail here.

BRIEF DESCRIPTION OF THE DRAWINGS

An exemplary embodiment of the housing of the invention shall be set forth in greater detail below with referenced drawings. Shown are.

DETAILED DESCRIPTION OF THE PREFERRED EMBODIMENT

Figure 1:
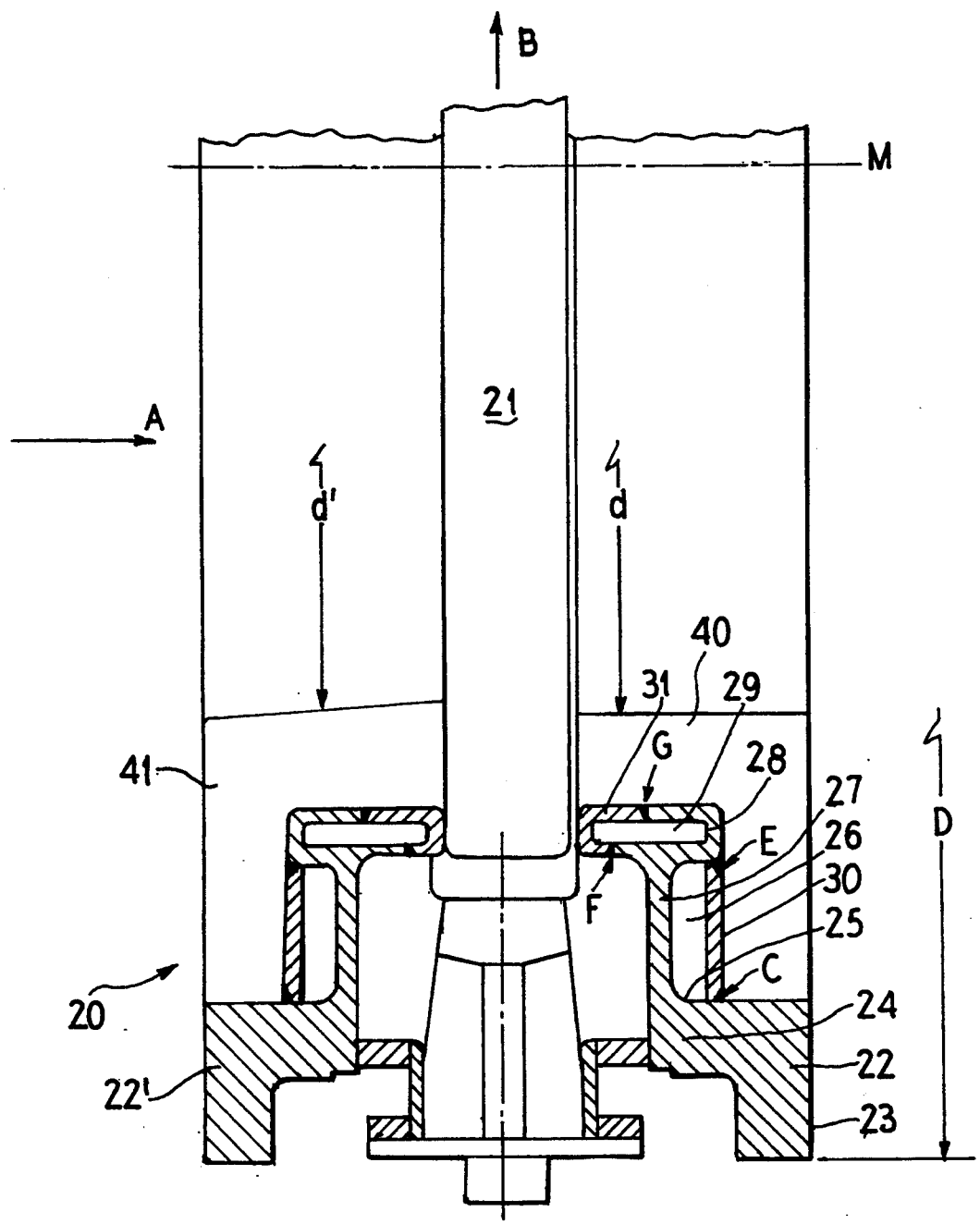
FIG. 1 a cross-section of a portion of a housing of the invention.

With reference to FIG. 1, a housing 20 of the invention shown excerpted in the lower region thereof, that is flooded by the hot-blast in the direction of the arrow A, comprises a slide valve 21 that is usually water-cooled and that is shown in its closed condition and that can be opened in the direction of the arrow B by a known, for example electric or hydraulic drive (not shown). At the side lying opposite the inflow side, the housing 20 comprises a housing part 22 fashioned essentially rotationally-symmetrically around a center axis M that proceeds parallel to the flow direction A, the annular region 23 of this housing part 22 which begins at the largest diameter D and proceeds toward the center axis M forming a flange for connection to a conduit (not shown). Bores for producing, for example, a screwed connection to the conduit are provided in the flange.

Following the annular region 23, the cross-section of the housing part 22 is continued in the form of an axial region 24 whose section directed toward the valve plate 21 forms a first part 25 of the wall of an outer annular channel 26.

The section 25 merges with a rounded portion into a second section 27 extending radially relative to the center axis M that forms a second part of the wall of the outer annular channel 26.

With rounded corners, the section 27 abuts at a right angle against a section 28 fashioned in the form of a prone U that is open toward the valve plate 21 and whose leg closest to the center axis M is shorter than the other leg, whereby the U-shaped cross-section forms a part of the wall of an inner annular channel 29.

A housing part 22' that is symmetrically mirror-inverted relative to the housing part 22 and that exhibits corresponding features (for which reason a more detailed description thereof is forgone here—is arranged at the inflow side of the housing.

The annular depression formed by the sections 25, 27 and the part of the U-shaped cross-section 28 directed toward the flange is closed with a first, annular part 30 for forming the outer annular channel 26, whereby annular welds are drawn at C and E.

The admission and discharge for the coolant, usually water, flowing in the annular channels 26, 29 are of a traditional type and are not shown.

A second annular part 31 for the formation of the inner annular channel 29 is put in place onto the free ends of the legs of the U-shaped cross-section 28, whereby the part 31 comprises a U-shaped cross-section having legs of unequal length, whereby the leg closest to the center axis M is longer than the other, so that the inner annular channel 29 comprises a cross-section roughly in the shape of a rectangle elongated parallel to the inflow direction A. The two ends of the legs of the two U-shaped parts are joined by two annular welds at F and G.

At that side lying opposite the inflow side, the housing comprises a refractory lining 40 of ceramic compound that is arranged between the housing part 22, the first and second annular parts 30, 31 on the one hand and the interior charged by the hot-blast on the other hand.

Correspondingly, a refractory lining 41 is arranged at the inflow side, the inside diameter d' thereof decreasing continuously toward the valve plate 21, whereas the inside diameter d of the refractory lining 40 is constant.

The other parts of the housing 20 to be seen in FIG. 1 are not critical to the invention and are therefore not set forth in greater detail.

Figure 2:
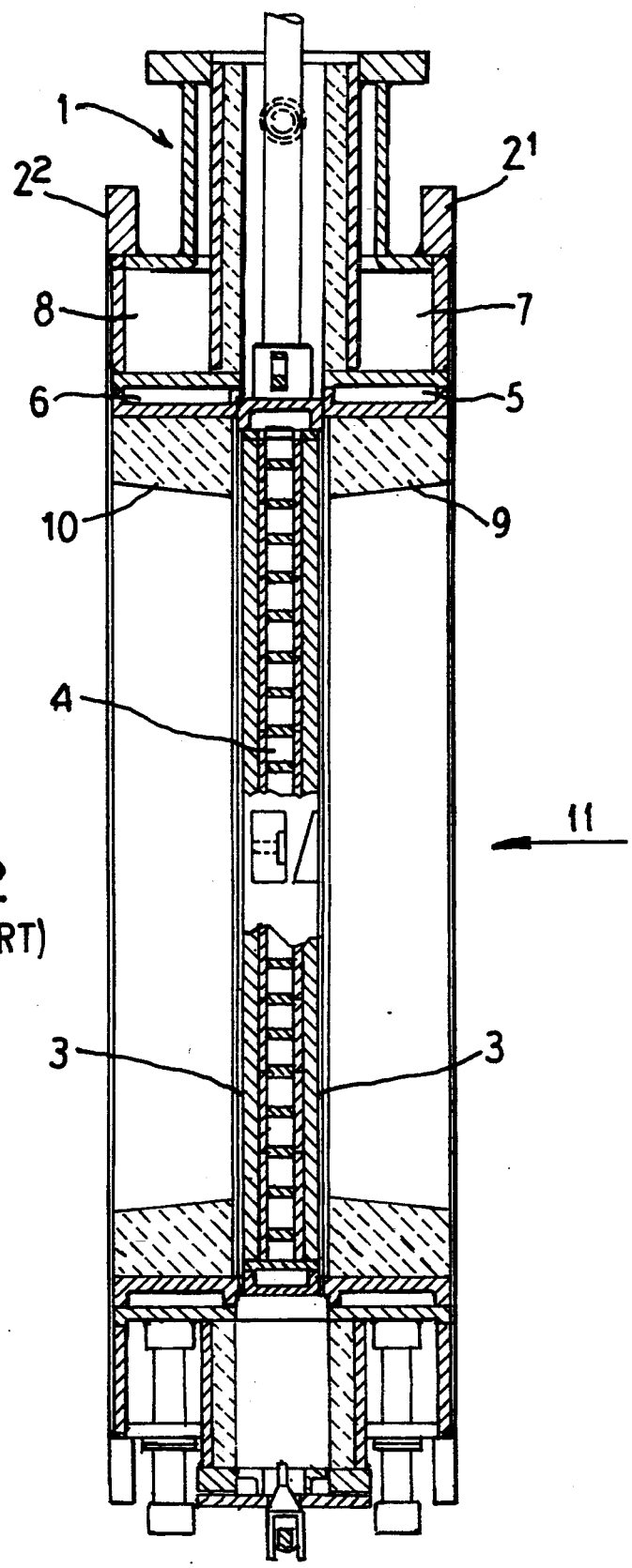
FIG. 2 a cross-section through a housing of the prior art.

With reference to FIG. 2, a hot-blast slide valve housing 1 of the prior art shown in cross-section comprises two flanges $2^1$, $2^2$ for connection to the conduits (not shown), comprises a guide space 3 for a valve plate 4 and comprises annular coolant channels 5, 6 and 7, 8 that are concentrically seated inside one another. Refractory linings 9, 10 are provided toward the hot-blast that flows in in the direction 11.

It may be seen that the inner annular channels 5, 6 each respectively comprise two component parts that are joined by respectively two annular welds, and that the outer annular channels 7, 8 each respectively comprise three further component parts that are joined by respectively four further, annular welds. Moreover, a respective flange part with a further weld is provided.

By contrast thereto, the housing for hot-blast slide valves of the invention requires three component parts and four welds at each side and represents a substantial simplification in terms of structure and manufacture.

As is apparent from the foregoing specification, the invention is susceptible of being embodiment with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:

1. A water-cooled housing for hot-blast slide valves having annular coolant channels arranged at both sides of a guide space for a valve plate lying following one another in a flow direction of a hot-blast and that are seated concentrically inside one another in pairs, comprising said annular channels being formed by two one-piece housing parts, each of which comprises two essentially annular depressions, said depressions being connectable by first and second annular parts for the formation of the annular channels.

2. A water-cooled housing according to claim 1, wherein said depressions for an outer one of each pair of said annular channels are open in a direction facing away from said valve plate and said depressions for an inner one of each of pair of annular channels are open in a direction facing toward the valve plate.

3. A water-cooled housing according to claim 1, wherein each of said one-piece housing parts that each respectively comprise two annular depressions, is essentially rotationally symmetrical relative to a center axis that proceeds parallel to said flow direction and comprises a cross-section that has a first, radially proceeding region in a region of its greatest diameter that forms a flange for the connection to a conduit, which comprises a second, axial region in a region of inside diameter of said flange that forms a first part of a wall of said outer annular channel, that, following thereupon, comprises a second region extending radially toward said center axis which forms a second part of the wall of said outer annular channel, that, following thereupon, merges approximately rectangularly toward both sides into one leg of an approximately U-shaped region that is arranged approximately parallel to said flow direction, that is open toward said valve plate and forms a part of the wall of said inner annular channel, whereby the one leg section proceeding to the apex of the U-shaped region forms a third part of the wall of said outer annular channel.

4. A water-cooled housing according to claim 3, wherein said leg of said U-shaped region lying toward said center axis is shorter than the other leg.

5. A water-cooled housing according to claim 3, wherein said second annular part comprises a U-shaped cross-section having legs of different lengths that supplements the U-shaped region of the housing part for the formation of the inner annular channel.

6. A water-cooled housing according to claim 1, wherein said first annular part for the formation of the outer annular channel has the shape of an essentially flat, annular plate.

7. A water-cooled housing according to claim 1, wherein said annular parts are connectable to said housing parts with welds that proceed at their inner and outer diameters.

8. A water-cooled housing according to claim 5, wherein said second annular parts are connectable to said housing parts with respective welds that proceed at the free ends of said legs.

9. A water-cooled housing for a hot-blast slide valve comprising:
   two pairs of annular coolant channels, said two pairs arranged following one another in a flow direction of a hot blast at both sides of a fluid space for a valve plate;
   said channels of each pair being seated concentrically inside one another;
   each of said pairs of channels being formed in a one-piece housing part having two annular depressions;
   a first annular part for overlying a first of said depressions to form a first channel; and
   a second annular part for overlying a second of said depressions to form a second channel.

10. A water-cooled housing according to claim 9, wherein said depressions for an outer one of each pair of said annular channels are open in a direction facing away from said valve plate and said depressions for an inner one of each pair of said annular channels are open in a direction facing toward said valve plate.

11. A water-cooled housing according to claim 9, wherein each of said one-piece housing parts is essentially rotationally symmetrical relative to a center axis that proceeds parallel to said flow direction, each housing part having a cross-section that comprises
   a first, radially proceeding region in a region of its greatest diameter that forms a flange for the connection to a conduit,
   a second, axial region in a region of an inside diameter of said flange that forms a first part of a wall of said outer annular channel,
   a third region extending radially toward said center axis which forms a second part of said wall of said outer annular channel,
   a fourth region extendly approximately perpendicularly from said third region toward both sides in one leg of an approximately U-shaped region that is arranged approximately parallel to said flow direction, said U-shaped region being open facing toward said valve plate and forming a part of the wall of said inner annular channel, whereby said one leg section proceeding to the apex of the U-shaped region forms a third part of the wall of said outer annular channel.

12. A water-cooled housing according to claim 11, wherein a leg of said U-shaped region lying toward said center axis is shorter than said one leg.

13. A water-cooled housing according to claim 11, wherein said second annular part comprises a U-shaped cross-section having legs of different lengths that supplements the U-shaped region of the housing part for the formation of said inner annular channel.

14. A water cooled housing according to claim 9, wherein said first annular part for the formation of said outer annular channel has the shape of an essentially flat, annular plate.

15. A water-cooled housing according to claim 9, wherein said annular parts are connectable to said housing parts with welds at their inner and outer diameters.

16. A water-cooled housing according to claim 13, wherein said second annular parts are connectable to said housing parts with welds at free ends of said legs.

* * * * *